Dec. 14, 1948. W. A. DIMICK 2,456,178
BALANCE WEIGHT ASSEMBLY FOR WEIGHING SCALES
Filed May 22, 1946

INVENTOR
WILLIAM A. DIMICK
BY
ATTORNEY

Patented Dec. 14, 1948

2,456,178

UNITED STATES PATENT OFFICE 2,456,178

BALANCE WEIGHT ASSEMBLY FOR WEIGHING SCALES

William A. Dimick, St. Johnsbury, Vt., assignor to Fairbanks, Morse & Co., Chicago, Ill., a corporation of Illinois Application May 22, 1946, Serial No. 671,611

2 Claims. (Cl. 265—56.5)

My invention relates to weighing scales generally, and has particular reference to an improved weigh beam and balance weight assembly for use in connection with high capacity scales.

The invention is chiefly directed to means for obtaining initial or no-load equilibrium of the scale mechanism, and the principal object resides in improved provisions for mounting and effecting the adjustment of a counterpoise or balance weight on a scale beam.

Another object is to provide a completely enclosed counterweight and mounting assembly of this character.

Yet another object is directed to an improved construction which greatly facilitates and reduces the manufacturing and assembly cost of the counterweight and beam organization.

Still another object is attained in the provision of simple yet highly effective means for preventing unintended displacement of the balance weight and for maintaining the same in an adjusted position.

These and other objects and advantages will be explained in the following specification wherein reference is made to the accompanying drawings, Fig. 1 of which is a front elevation of a portion of a weighing scale beam and bearing stand, showing the manner in which the balancing device is entirely enclosed;

Figure 2:
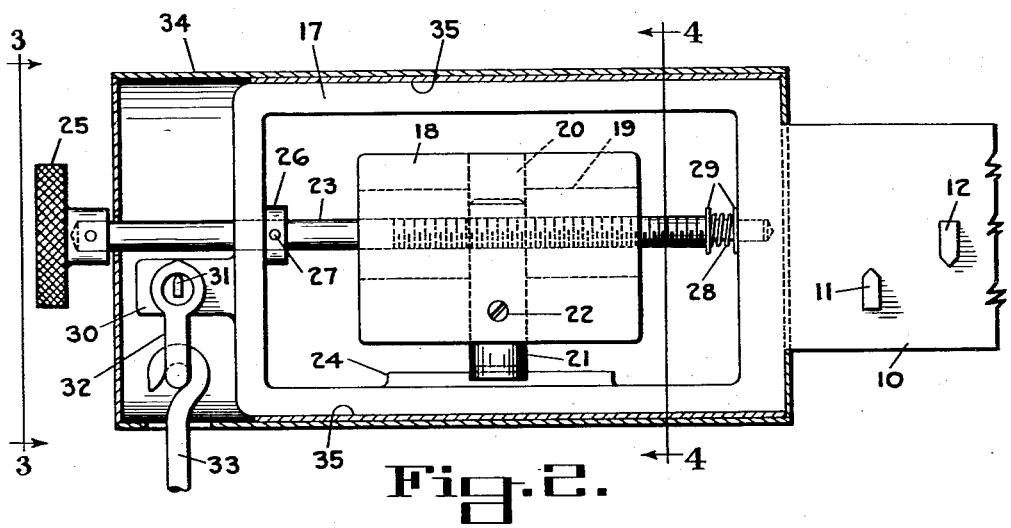
Fig. 2 is a front elevation of the end of the beam with one of the cover plates removed to disclose the balancing device.
Figure 3:
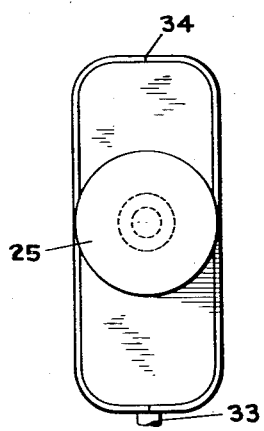
Fig. 3 is an end view of the beam as indicated by line 3—3 of Fig. 2.
Figure 4:
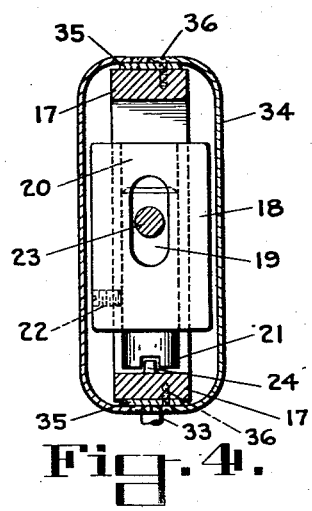
Fig. 4 is a sectional view of the invention taken on line 4—4 of Fig. 2.
Figure 1:
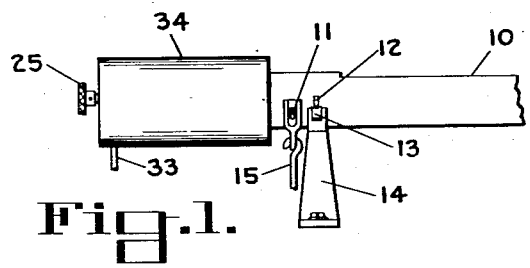

Referring now by characters of reference to the drawings, the numeral 10 designates a weighing scale beam having a load pivot 11 and a fulcrum pivot 12, the latter being seated on a fulcrum bearing block 13 supported by a bearing stand 14. Load forces are transmitted through the steelyard rod 15 to the load pivot 11, the rod 15 being connected at its lower end to unillustrated parts of the scale mechanism which are not directly involved in the present invention.

The butt end of the beam is in the form of a rectangular frame 17 which surrounds and accommodates the balance weight 18, the latter being supported for longitudinal adjustment in the manner hereinafter described, as for purposes of equilibrating the lever system and correcting the no-load balance of the weigh beam. The balance weight 18 is formed to provide therein a horizontal or longitudinal passage 19 and a vertical or transverse passage 20, these passages extending at a right angle and intersecting each other near the center of the weight. A plug-like member 21 is removably disposed in the vertical passage 20 and fixedly positioned therein by the screw 22. The member 21 is provided with a transverse or horizontal bore located in alignment with the horizontal weight passage 19, and this bore is threaded to receive a threaded rod or shaft 23 on which the weight is supported. The plug member 21 projects outwardly from the lower side of the weight and is provided at its end with a kerf or channel that accommodates a rib 24 formed on the lower frame member of the beam, the coaction of these parts serving to prevent the weight from turning with the rod 23 when the latter is rotated for adjusting the longitudinal position of the weight on the beam.

The threaded rod 23 is journalled in bearing openings in the end members of the beam frame structure and projects outwardly beyond the end of the beam. At its end the rod 23 is provided with a knurled manipulating knob 25. A collar 26 fixedly secured to the rod by a set screw 27 is held in pressure contact with the inner surface of the end frame member by means of a spring 28 which is compressed between washers 29, one of which bears against the inner surface of the opposite frame member and the other against a shoulder formed on the rod. The action of spring 28 tends to eliminate any end play of the rod which would effect beam balance, and by creating pressure at the contact surfaces of the collar 26 and frame member tends to prevent accidental turning of the rod.

In accordance with conventional practice the butt end of the beam is provided with means for holding additional counterweights, such means consisting, in the present example of an integrally formed extension 30 having a pivot member 31 which supports a bearing loop 32 from which depends a weight carrier 33.

The butt end of the beam is enclosed by a longitudinally split sheet metal casing structure 34. Plates or strips 35 are arranged in lapped relation to marginal portions of the shell sections and are permanently secured as by spot welding to one thereof. The sections are removably secured together and to the beam by screws 36. The rod 23 projects through an opening in the end wall of the casing as shown so that the balance weight may be adjusted without requiring removal of the casing.

What I claim and desire to secure by Letters Patent is:

1. A weight beam having an opening formed therein near its butt end, a balance weight mounted in said opening, said weight having horizontal and vertical intersecting passages extending therethrough, a threaded shaft extending through said horizontal weight passage, said shaft being journalled for rotation in portions of the beam at opposite ends of said opening, a removable member fixedly disposed in said vertical weight passage, said member having a horizontal threaded bore in threaded connection with said shaft, said member projecting outwardly from the weight slidably engaging the beam, a collar fixed to said shaft adjacent a portion of the beam, and a spring acting on said shaft, and with said collar tending to prevent endwise movement of said shaft.

2. A weight beam having an opening formed therein near its butt end, a balance weight having horizontal and vertical intersecting passages, said weight being mounted on said beam within said opening, a casing enclosing the butt end of the beam and said balance weight, a threaded shaft for adjusting the position of said weight, said shaft extending through the end of said casing, the end of the beam, and through the horizontal passage in the balance weight, a member removably disposed in said vertical weight passage and projecting outwardly therefrom, said member having a threaded bore to receive said shaft, means on said beam coacting with the projecting end of said member to prevent said member and the weight from turning with the shaft, and means constraining said shaft against movement endwise of the beam, comprising a collar fixed to the shaft, and a spring acting on said shaft to maintain said collar against an abutment surface on the beam.

WILLIAM A. DIMICK.

REFERENCES CITED

The following references are of record in the file of this patent:

UNITED STATES PATENTS

| Number | Name | Date |
|---|---|---|
| 440,363 | Pearsons | Nov. 11, 1890 |
| 575,076 | Swihart | Jan. 12, 1897 |
| 780,816 | Sargent | Jan. 24, 1905 |
| 921,285 | Ruckes | May 11, 1909 |
| 1,018,456 | Vidinghoff | Feb. 27, 1912 |
| 1,603,021 | Bousfield | Oct. 12, 1926 |
| 1,904,446 | Gumprich | Apr. 18, 1933 |